United States Patent [19]

Petersen

[11] Patent Number: 4,777,214
[45] Date of Patent: Oct. 11, 1988

[54] BLENDS OF POLY(ARYLENE ETHER KETONES) AND TETRAFLUOROETHYLENE COPOLYMERS

[75] Inventor: Marianne Petersen, Redwood City, Calif.

[73] Assignee: Raychem Corporation, Menlo Park, Calif.

[21] Appl. No.: 945,408

[22] Filed: Dec. 22, 1986

Related U.S. Application Data

[63] Continuation-in-part of Ser. No. 816,087, Jan. 3, 1986, abandoned, which is a continuation-in-part of Ser. No. 700,356, Feb. 11, 1985, abandoned.

[51] Int. Cl.$^4$ .............................................. C08L 71/00
[52] U.S. Cl. ................................... 525/146; 525/151; 525/153
[58] Field of Search .................. 525/151, 153, 146

[56] References Cited

U.S. PATENT DOCUMENTS

| | | |
|---|---|---|
| 3,400,065 | 9/1968 | Barth . |
| 4,332,714 | 6/1982 | Haaf et al. ............... 525/151 |
| 4,351,882 | 9/1982 | Concannon ............... 428/422 |
| 4,355,126 | 10/1982 | Haaf et al. ............... 525/68 |
| 4,477,630 | 10/1984 | Saito et al. ............... 525/151 |
| 4,505,982 | 3/1985 | Hoheisel ............... 525/151 |
| 4,546,141 | 10/1985 | Gebauer . |
| 4,578,427 | 3/1986 | Saito et al. ............... 525/151 |

FOREIGN PATENT DOCUMENTS

| | | |
|---|---|---|
| 51933 | 5/1982 | European Pat. Off. . |
| 159767 | 10/1985 | European Pat. Off. . |
| 58-160346 | 9/1983 | Japan ............... 525/151 |
| 58-160347 | 9/1983 | Japan ............... 525/151 |
| 6079053 | 10/1983 | Japan . |
| 58-179262 | 10/1983 | Japan . |

OTHER PUBLICATIONS

Enclopedia of Chemical Technology, 3rd Ed., vol. 11, pp. 7-8, 37-38, and 49, John Wiley & Sons, 1980.
Soltex Polymer Corp., Brochure No. 7/85/2.5M.

*Primary Examiner*—Carman J. Seccuro
*Attorney, Agent, or Firm*—Yuan Chao; Edith A. Rice; Herbert G. Burkard

[57] ABSTRACT

The invention relates to novel compositions comprising an admixture of (a) a semi-crystalline, thermoplastic poly(arylene ether ketone) having a crystalline melting point above about 320° C. and (b) a substantially non-crystalline fluorocarbon polymer capable of withstanding temperature above about 320° C. for at least about 5 minutes without substantial degradation, said fluorocarbon polymer comprising a copolymer of tetrafluoroethylene wherein the tetrafluoroethylene content of the copolymer is about 5 to about 85% by weight based on the weight of the copolymer, said composition being capable of being melt processed at a temperature above the crystalline melting point of the poly(arylene ether ketone). The compositions exhibit high temperature processability, resistance to solvents, and improved dielectric properties. The compositions can be further used as substrate coatings or formed into articles.

17 Claims, No Drawings

BLENDS OF POLY(ARYLENE ETHER KETONES) AND TETRAFLUOROETHYLENE COPOLYMERS

This application is a continuation-in-part of U.S. Ser. No. 816,087, filed Jan. 3, 1986 which in turn is a continuation-in-part of U.S. Ser. No. 700,356, filed Feb. 11, 1985, both now abandoned, the disclosures of which are incorporated herein by reference.

BACKGROUND OF THE INVENTION (a) Field of the Invention

The invention relates to novel compositions comprising a first polymer component comprising a poly(arylene ether ketone) and a second polymer component comprising a copolymer of tetrafluoroethylene.

(b) Background and Invention

Poly(arylene ether ketones) are linear thermoplastic polymers that exhibit excellent mechanical, physical, chemical and electrical properties, and are especially useful for their superior thermal properties. These polymers can be molded by conventional techniques into shaped articles for a wide variety of end uses. These polymers are ductile, machinable, self-extinguishing and relatively inert to most aqueous mineral acids. However, it has been found that poly(arylene ether ketones) exhibit crazing under certain conditions of strain induced by certain solvents and are stiff and relatively inflexible.

Copolymers of propylene and tetrafluoroethylene are known in the art. In U.S. Pat. No. 3,467,635 such copolymers are crosslinked with a curing agent such as a peroxide or an amine. In U.S. Pat. No. 3,718,558 copolymers are described which have been crosslinked using high energy ionizing radiation, such as an electron accelerator. High mechanical strength copolymers of propylene and tetrafluoroethylene are described in U.S. Pat. No. 3,825,510. Such polymers absorb mineral acids. Copolymers of tetrafluoroethylene and (hexafluoropropylene and vinylidene fluoride) are also known. These copolymers are recognized as appreciably different in properties from copolymers of vinylidine fluoride and hexafluoropropylene alone. See U.S. Pat. No. 3,306,879. These patents are incorporated herein by reference.

Poly(arylene ether ketones) and copolymers of propylene and tetrafluoroethylene have previously been independently mixed with other polymers. In U.S. Pat. No. 4,395,512 copolymers of propylene and tetrafluoroethylene are mixed with a polyphenylenesulfide. The mixtures exhibit improved impact resistance but do not exhibit reduced mineral acid absorption.

In U.S. Pat. No. 3,400,065 blends of poly(arylene ethers) with copolymers of vinylidene fluoride-hexafluoropropylene (Viton A from DuPont) are disclosed. It is reported that the poly(arylene ether) can be a poly(arylene ether ketone). However, only one poly(arylene ether ketone) is used in a working example and it is one which can be processed at relatively low temperatures. It has been found that poly(arylene ether ketones) requiring higher processing temperatures cannot be successfully blended with vinylidene fluoride-hexafluoropropylene copolymers.

SUMMARY OF THE INVENTION

The invention relates to novel compositions comprising an admixture of (a) a semi-crystalline, thermoplastic poly(arylene ether ketone) having a crystalline melting point above about 320° C. and (b) a substantially non-crystalline fluorocarbon polymer capable of withstanding temperature above about 320° C. for at least about 5 minutes without substantial degradation, said fluorocarbon polymer comprising a copolymer of tetrafluoroethylene wherein the tetrafluoroethylene content of the copolymer is about 5 to about 85% by weight based on the weight of the copolymer, said composition being capable of being melt processed at a temperature above the crystalline melting point. In a preferred embodiment, the fluorocarbon polymer comprises a copolymer of tetrafluoroethylene and (a) propylene or (b) vinylidene fluoride and hexafluoropropylene. It is further preferred that the poly(arylene ether ketone) is a continuous phase. It is further preferred that the fluorocarbon polymer is a dispersed phase. In preferred embodiments of this invention, the poly(arylene ether ketone) comprises 35 to 95 weight percent of the composition, more preferably 70 to 95 weight percent. The compositions of the invention exhibit improved resistance to solvents, are less stiff, and exhibit improved dielectric properties when compared with poly(arylene ether ketones) alone and are processable at high temperature. The invention further relates to articles and substrate coatings comprising said composition.

The fluorocarbon polymer used in the composition of the invention is substantially non-crystalline and is capable of withstanding temperatures above about 320° C. for at least about 5 minutes without substantial degradation. By substantially non-crystalline is meant that the amount of TFE incorporated into the copolymer is selected such that the copolymer exhibits low or no crystallinity. The fluorocarbon polymer further comprises a copolymer of tetrafluoroethylene.

Tetrafluoroethylene units (TFE) ($-CF_2CF_2-$) comprise from about 5%, preferably from about 10%, more preferably, from about 15% to about 85%, preferably to about 70%, more preferably, to about 50% by weight of the copolymer. The exact proportion may vary slightly depending on the other monomer(s) selected.

Selection of a monomer or monomers as copolymers with tetrafluoroethylene can be accomplished by one skilled in the art. Selection of a monomer or monomers is limited, in general, beyond the limits described above only by the ability of the monomer to copolymerize with tetrafluoroethylene. It is preferred that if the monomer selected for the copolymer is propylene, the monomer be substantially alternating with the TFE. When selecting a monomer or monomers for incorporation in the second polymer component where said monomer is sensitive to thermal chain scission after polymerization, it is then preferred that the thermally sensitive monomer be incorporated into the copolymer such that no more than 2 and preferably no more than 1 consecutive thermally sensitive monomer unit occur in the copolymer. For example, when the monomer selected is propylene, it is preferred that only 1 consecutive propylene unit occur in the copolymer. If 2 consecutive propylene units are to occur at all in the copolymer, the incidence thereof should be limited to about 1 or 2 times in the entire copolymer molecule.

Monomers which can be copolymerized with tetrafluoroethylene include but are not limited to, for example propylene, vinylidene fluoride, hexafluoropropylene, perfluoroalkylvinylether, ethylene, butylene, isobutylene, methylvinylether, ethylvinylether, propylvinylether, isopropylvinylether, the various isomeric butyl vinyl ethers, 2-ethylhexylvinylether, n-dodecylvinylether, n-hexadecylvinylether, n-octadecyl vinylether, 1-isobutylene-3,5-dimethylhexylvinylether, 2-methoxyvinylether, 2-butoxyethylvinylether, 2-chloroethyl vinylether, 2-bromoethylvinylether, 2-iodoethylvinyl ether, 2-formamidoethylvinylether, 2-acetamidoethyl vinylether, 2-octanoylaminoethylvinyl ether and 2-hydroxyethylvinylether.

Preferred copolymers of tetrafluoroethylene and propylene are commercially available under the trade name of Aflas (Asahi Glass) in a number of varying molecular weights, which have a molecular weight from about 20,000 to about 120,000.

Preferred copolymers of tetrafluoroethylene and vinylidine fluoride and hexafluoropropylene are commercially available under the trade names of Viton B (Dupont) and Fluorel (3M) in a number of varying molecular weights.

Semi-crystalline, thermoplastic poly(arylene ether ketones) used in the invention should have a crystalline melting point above about 320° C. The term semi-crystalline is known in the art. Semi-crystalline polymers are those polymers having a crystalline portion which exhibits a crystalline melting point and a non-crystalline portion.

Poly(arylene ether ketones) suitable for use in this invention have the repeat units of the formula

—CO—Ar—CO—Ar'— wherein Ar and Ar' are aromatic moieties at least one of which contains a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoro-alkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(arylene ether ketones) having the following repeat units (the simplest repeat unit being designated for a given polymer) are preferred:

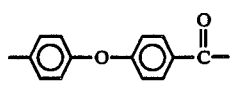 I

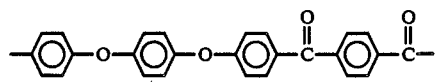 II

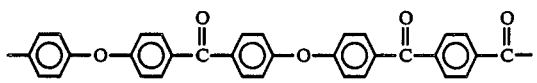 III

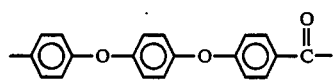 IV

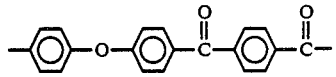 V

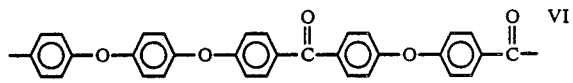 VI

Poly(arylene ether ketones) can be prepared by known methods of synthesis. Preferred poly(arylene ether ketones) can be prepared by Friedel-Crafts polymerization of a monomer system comprising:

(I) (i) phosgene or an aromatic diacid dihalide together with (ii) a polynuclear aromatic comonomer comprising:

 (a)

 (b)

wherein n is 2 or 3

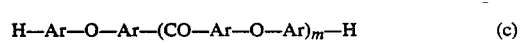 (c)

wherein m is 1, 2 or 3
or
(II) an acid halide of the formula:

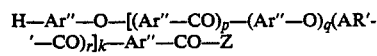

wherein Z is halogen, k is 0, 1 or 2, p is 1 or 2, q is 0, 1 or 2 and r is 0, 1 or 2;
or
(III) an acid halide of the formula:

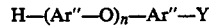

wherein n is 2 or 3 and Y is CO—Z or

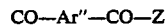

where Z is halogen;
wherein each Ar'' is independently selected from substitutued or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system;

(C) a non-protic diluent in an amount from 0 to about 93% by weight, based on the weight of the total reaction mixture.

The aromatic diacid dihalide employed in preferably a dichloride or dibromide. Illustrative diacid dihalides which can be used include, for example

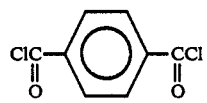

-continued

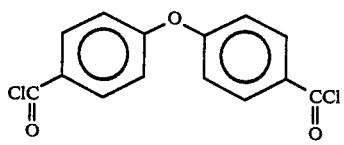

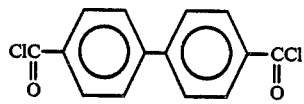

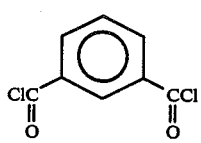

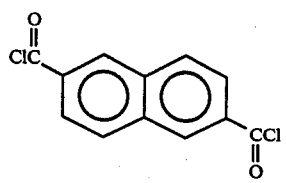

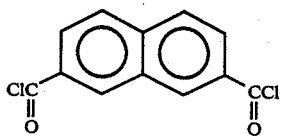

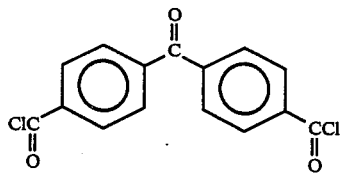

wherein a is 0-4.

Illustrated polynuclear aromatic comonomers which can be used with such diacid halides are:

(a) H—Ar″—O—Ar″—H, which includes, for example:

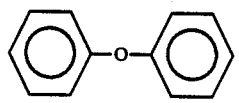

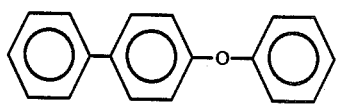

(b) H—(Ar″—O)$_n$—Ar″—H, which include, for example:

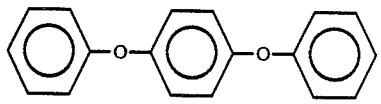

and

(c) H—Ar″—O—Ar″—(CO—Ar″—O—Ar″)$_m$—H, which includes, for example:

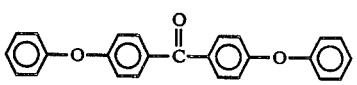

and (d) H—(Ar″—O)$_n$—Ar″—CO—Ar″—(O—Ar″-)$_m$—H which includes, for example:

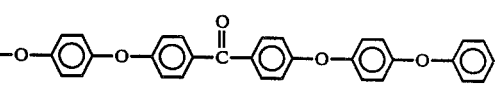

Monomer systems II and III comprise an acid halide. (The term acid halide is used herein to refer to a monoacid monohalide). In monomer system II, the acid halide is of the formula:

H—Ar″—O—[(Ar″—CO)$_p$—(Ar″—O)$_q$—(Ar′'—CO)$_r$]$_k$—Ar″—CO—Z

Such monomers include for example, where k=0

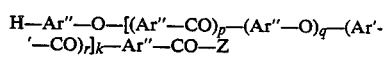

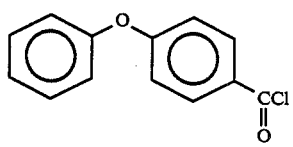

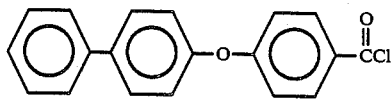

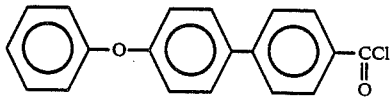

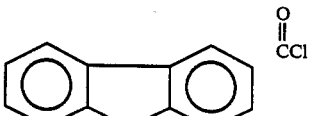

and where k=1

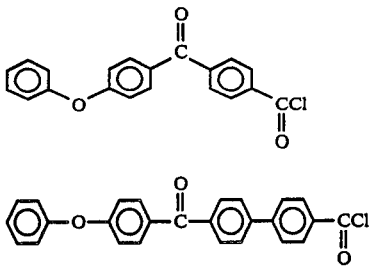

In monomer system III, the acid halide is of the formula

H—(Ar''—O)$_n$—Ar''—Y

Examples of such acid halides include

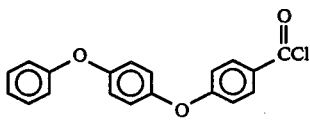

and

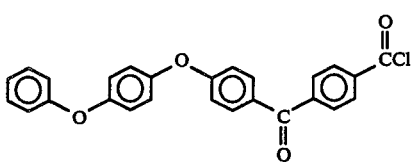

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long a one or more of the comonomers used contains at least one ether oxygen linkage. Such comonomers include for example:

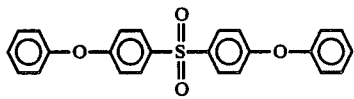

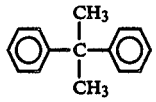

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

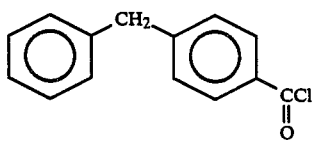

can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(arylene ether ketones) can be found in commonly assigned co-pending U.S. application Ser. No. 594,503, filed Mar. 31, 1984, the disclosure of which is incorporated herein by reference.

Other processes for preparing these polymers can be found in U.S. Pat. Nos. 3,953,400, 3,956,240, 3,928,295, 4,176,222 and 4,320,220.

The compositions of the invention can contain various additives, in order to give a desired property to the polymer composition. For example, stabilizers, reinforcing or non-reinforcing fillers, pigments, carbon black, plasticizers, surfactants, processing aids, and the like can be present. Compatible or non-compatible polymers may also be added to give a desired property. The invention also relates to a reinforced composition comprising the composition and a reinforcing component e.g. the addition of carbon or glass fibers or other polymeric fibers or the like such as polyamides thus providing a high strength polymer.

Where appropriate and within the skill in the art, minor amounts of additives may be copolymerized with the polymers or copolymers of the invention. The polymers or copolymers may also contain minor amounts of other copolymerizable components. For example, copolymers of tetrafluoroethylene and propylene may contain minor amounts of copolymerizable components such as ethylene, isobutylene, acrylic acid, vinyl fluoride, hexafluoropropylene, vinylidine-fluoride, chlorotrifluoroethylene, and chloroethylvinylether. While cure site monomers may be copolymerized into the polymers and copolymers of the invention without harm, attempts to chemically crosslink the composition may lead to processing difficulties.

The compositions of the invention may be crosslinked by one skilled in the art by suitable high energy ionizing radiation including rays, rays, x-rays, accelerating particle rays, neutron rays, and electron beams. Any type of ionizing radiation source is preferable such as cobalt-60, Cesum-137, Kryptron-83, atomic energy generators such as atomic reactors, various types of particle accelerators, x-ray generators, and electron beam generators. It is more preferable to use gamma rays from a cobalt-60 source, beta particle rays and accelerated electrons.

Some of the compositions of the invention may also be crosslinked by heat. One skilled in the art would be able to decide which polymers are object to heat crosslinking.

The compositions can be prepared by any convenient technique. For example, the components can be prepared on a two-roll mill, in an internal mixer such as a Brabender mixer or Banbury mixer, or in a single or twin-screw extruder. They may also be prepared by precipitation from a solvent, or cast from solution or the like.

A shaped article of the composition can be formed by known techniques depending on the desired shape. Films or coatings of the composition can be formed by extrusion, spraying, spin coating or casting, and formed fibers by melt spinning or the like. Other articles may be injection molded, compression molded, pour molded, blow molded or the like with or without additives as previously described.

The compositions of the invention can be used in a variety of shaped articles and coatings. So, for example, they could be shaped as films, sheets, pipes, rods, rings, membranes, powders or formula. They can be used as coatings such as for wire, pipes or the like. They can be used as sleeves, for example, on rollers in thermographic copy machines and the like. Further they can be used as shaped articles such as containers, clips, panels, devices and the like. In a preferred embodiment the invention relates to wire coatings.

In another preferred embodiment the invention relates to a valve seat comprising the composition of the invention. Valve seats vary widely in the amount of wear and friction they must withstand. This depends greatly on the type of valve actually used. For example, a ball valve makes sliding contact and exhibits considerable friction, whereas a butterfly valve exhibits relatively slight friction. All valves seats, however, have in common the necessity to have mechanical properties that provide a seal. A valve seat must have a "compression set" low enough to provide a seal, i.e. they must be relatively slightly compliant while maintaining resistance to wear and friction. It has been surprisingly discovered that compositions of the invention have a compression set that provides a seal and withstand a high degree of wear and friction.

The following examples are representative of the invention but not intended to be limiting. Substitution of additives, materials, polymer, and conditions which are obvious from this disclosure are within the contemplation of the invention.

DESCRIPTION OF THE PREFERRED EMBODIMENTS

EXAMPLE 1

Processing

Blends of Victrex PEEK (poly(arylene ether ketone) from ICI) (Formula IV) and Aflapropylene and tetrafluoroethylene from Asahi Glass) and blends of the poly(arylene ether ketone) of formula I poly(ether ketone) and Aflas 100H were prepared from a dry blend of the components using a corotating twin screw extruder (ZSK). Similar bends were also prepared substituting a copolymer of tetrafluoroethylene, vinylidene fluoride and hexafluoropropylene (Viton B from DuPont or Fluorel FLS2690 from 3M). Strands were cooled in air or in a room temperature water trough and pelletized. Extruder processing temperature are as follows:

| | |
|---|---|
| Victrex PEEK/Aflas 100H | 625–685° F. |
| Formula I/Aflas 100H | 670–720° F. |
| Victrex PEEK/Viton B or Fluorel | 645–675° F. |
| Formula I/Viton B or Fluorel | 670–720° F. |

Blends contained from 2% to 90% Aflas in the following concentrations 2%, 5%, 10%, 20%, 25%, 30%, 40%, 60%, 80% and 90%. Blends contained 10 or 20% Viton B or Fluorel FLS2690.

EXAMPLE 2

Some blends were also prepared in a Brabender mixing bowl at a temperature of 370° C. at 60 rpm for 10 minutes.

EXAMPLE 2A

Wire Coating 5-6 ml thick wire coatings were made using the composition of Example 1 on a 1½" extruder.

Wire coatings were also made using Victrex PEEK/Viton A (copolymer of vinylidene fluoride/hexafluoropropylene by Dupont) blends. See Table.

MECHANICAL PROPERTIES OF WIRE COATINGS

| | Elastomer Copolymer % Concentration | (PSI) Tensile Strength 1st *Ext 1 | (PSI) Tensile Strength 2nd Ext. | % Elongation 1st Ext | % Elongation 2nd Ext. | 2% Secant Modulus (PSI) |
|---|---|---|---|---|---|---|
| Victrex PEEK/ Aflas | 2 | 16,400 | 16,500 | 143 | 130 | 388,000 |
| | 5 | 17,800 | 15,700 | 137 | 127 | |
| | 10 | 16,200 | 16,100 | 135 | 130 | 314,000 |
| | 20 | 13,500 | | 130 | | 268,000 |
| | 25 | 15,800 | | 120 | | |
| | 30 | 12,300 | | 123 | | 203,000 |
| | 40 | 12,100 | | 40 | | 224,000 |
| Formula I/ Aflas | 10 | 15,600 | | 90 | | |
| | 20 | 10,700 | | 118 | | |
| Victrex PEEK/ VitonAHV | 5 | 15,900 | | 130 | | |
| | 10 | 14,600 | | 135 | | |
| | 20 | 12,000 | 14,400 | 77 | 127 | |
| | 30 | 12,500 | | 103 | | |
| Victrex PEEK/ Flourel FLS2690 | 10 | 16,100 | | 160 | | |
| | 20 | 14,800 | | 137 | | |
| Formula I/ Flourel FLS2690 | 10 | 14,800 | | 27 | | |
| Victrex PEEK/ Viton B | 10 | 14,600 | | 127 | | |
| | 20 | 13,800 | | 113 | | |
| Formula I/ Viton AHV | 10 | (degrades on compounding) | | | | |
| Formula I/ Viton B | 10 | (compounded but could not process to wire coating) | | | | |

1-Ext = Extrusion
*Extrusion values listed for 2 separate runs.

EXAMPLE 3

Dielectric Breakdown Strengths following Methyl Ethyl Ketone Exposure:

| Material | % Elastomer Concentration | Dielectric (kV) Breakdown (Avg of 5) | Dielectric Breakdown (Avg of 5) |
|---|---|---|---|
| Victrex PEEK/ Aflas | 0 | 1.6 | 1.5* |
| | 2 | 1.7 | 14.8 |
| | 5 | 8.3 | 11.7 |
| | 10 | 9.1 | 13.7 |
| | 20 | 13.0 | |
| | 25 | 8.1 | |
| | 30 | 5.6 | |
| | 40 | 1.4 | |
| Victrex PEEK/ Viton AHV | 5 | 11.4 | |
| | 10 | 5.6 | |
| | 20 | 1.9 | 12.6 |
| | 30 | 10.3 | |
| V PEEK/Fluorel FLS2690 | 10 | 10 | |
| | 20 | 9.8 | |
| Victrex PEEK/ Viton B | 10 | 2.4 | |
| | 20 | 6.2, 11.4** | 6.0 |
| Formula I | 0 | 1.8 | |
| Formula I/Aflas | 10 | 8.6 | |
| | 20 | 12.3 | |
| Formula I/Viton AHV | 10 | — | |
| Formula I/Fluorel FLS2690 | 10 | 1.3 | |

-continued

| Material | % Elastomer Concentration | Dielectric (kV) Breakdown (Avg of 5) | Dielectric Breakdown (Avg of 5) |
|---|---|---|---|
| Formula I/Viton B | 10 | — | |

*Second set of measurements on another wire coating
**Repeat measurement, same wire coating

EXAMPLE 4

Mineral Acid Absorption

Swelling of the polymer compositions of Victrex PEEK/Aflas and polyphenylene sulfide(PPS)/Aflas were tested after one week in 37.5% HCL by measuring weight change of samples suspended in a 70° C. refluxing solution with the following results

SOLVENT RESISTANCE OF AFLAS BLENDS

| VOL % VICTREX PEEK | SWELL % PEEK/AFLAS BLEND | VOL % PPS | SWELL % PPS/AFLAS BLEND |
|---|---|---|---|
| 100 | 4.39 | 100 | |
| 91 | 1.08 | 90 | |
| 82 | 1.67 | 79 | 4.39 |
| 63 | 3.50 | 59 | 12.50 |
| 43 | 8.94 | 39 | 20.90 |
| 22 | 23.40 | 19 | 33.60 |
| | | 10 | 33.80 |
| | | 5 | 32.50 |
| 0 | 29.40 | 0 | 29.40 |

I claim:

1. A composition comprising an admixture of (a) a semi-crystalline, thermoplastic poly(arylene ether ketone) having a crystalline melting point above about 320° C. and (b) a substantially non-crystalline fluorocarbon polymer comprising a copolymer of tetrafluoroethylene and (i) propylene or (ii) vinylidene fluoride and hexafluoropropylene, wherein the tetrafluoroethylene content of the copolymer is about 5 to about 85% by weight based on the weight of the copolymer, said composition being capable of being melt processed at a temperature above the crystalline melting point of the poly(arylene ether ketone) and having the poly(arylene ether ketone) as a continuous phase.

2. A composition according to claim 1 wherein the poly(arylene ether ketone) comprises 35 to 95 weight percent of the composition.

3. A composition according to claim 1 which has been crosslinked.

4. A composition according to claim 1 wherein the poly(arylene ether ketone) is of the formula:

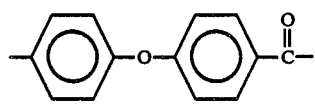

5. A composition according to claim 1 wherein the poly(arylene ether ketone) is of the formula:

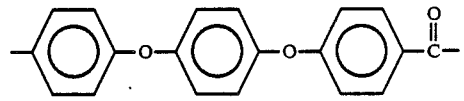

6. An article comprising a composition comprising an admixture of (a) a semi-crystalline, thermoplastic poly(arylene ether ketone) having a crystalline melting point above about 320° C. and (b) a substantially non-crystalline fluorocarbon polymer comprising a copolymer of tetrafluoroethylene and (i) propylene or (ii) vinylidene fluoride and hexafluoropropylene, wherein the tetrafluoroethylene content of the copolymer is about 5 to about 85% by weight based on the weight of the copolymer, said composition being capable of being melt processed at a temperature above the crystalline melting point of the poly(arylene ether ketone) and having the poly(arylene ether ketone) as a continuous phase.

7. An article according to claim 6 wherein the poly(arylene ether ketone) comprises 35 to 95 weight percent of the composition.

8. An article according to claim 6 wherein said composition has been crosslinked.

9. An article according to claim 6 wherein the poly(arylene ether ketone) is of the formula:

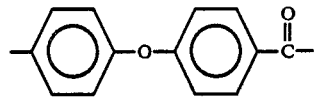

10. An article according to claim 6 wherein the poly(arylene ether ketone) is of the formula:

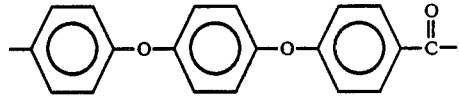

11. An article according to claim 6 which is a valve seat.

12. A composition according to claim 1, wherein the fluorocarbon polymer is a dispersed phase.

13. A composition according to claim 1, wherein the fluorocarbon polymer comprises a copolymer of tetrafluoroethylene and propylene.

14. A composition according to claim 1, wherein the fluorocarbon polymer comprises a copolymer of tetrafluoroethylene, vinylidene fluoride, and hexafluoropropylene.

15. An article according to claim 6, wherein the fluorocarbon polymer is a dispersed phase.

16. An article according to claim 6, wherein the fluorocarbon polymer comprises a copolymer of tetrafluoroethylene and propylene.

17. An article according to claim 6, wherein the fluorocarbon polymer comprises a copolymer of tetrafluoroethylene, vinylidene fluoride, and hexafluoropropylene.

* * * * *